United States Patent [19]

Cain et al.

[11]  4,226,711
[45]  Oct. 7, 1980

[54] OIL SPILL RECOVERY METHOD AND APPARATUS

[76] Inventors: Leno M. Meneghetti, No. 8 Arabian Trail, Springfield, Ill. 62702; Huey A. Cain, 607 N. 8th, Carmi, Ill. 62821

[21] Appl. No.: 924,516

[22] Filed: Jul. 14, 1978

[51] Int. Cl.² .............................................. E02B 15/04
[52] U.S. Cl. ........................... 210/691; 210/DIG. 26; 210/723; 210/924; 210/242 S
[58] Field of Search ........... 210/39, 40, 242, DIG. 26, 210/24, 73 W, 83

[56] References Cited

U.S. PATENT DOCUMENTS

| | | | |
|---|---|---|---|
| 2,464,204 | 3/1949 | Beltev | 210/DIG. 26 |
| 3,414,511 | 12/1968 | Hitzmann | 210/DIG. 26 |
| 3,562,153 | 2/1971 | Tully et al. | 210/DIG. 26 |
| 3,566,698 | 1/1971 | Tully et al. | 210/DIG. 26 |
| 3,704,784 | 12/1972 | Craggs et al. | 210/DIG. 21 |
| 3,723,307 | 3/1973 | Hunter | 210/DIG. 26 |
| 3,800,950 | 4/1974 | Hess et al. | 210/DIG. 26 |
| 4,031,005 | 6/1977 | Dev | 210/DIG. 26 |

*Primary Examiner*—Theodore A. Granger
*Attorney, Agent, or Firm*—Gravely, Lieder & Woodruff

[57] ABSTRACT

The recovery of oil in an oil spill on water is achieved by a medium which not only absorbs the oil but causes it to become heavy and loose its buoyancy in relation to water so it can be made to sink, together with apparatus for effecting the deposit of the medium upon the oil in an oil spill and for collecting the sinking oil below the surface and before it attaches itself to the bottom surface so it can be removed to a place where the recovered oil may be extracted from the medium which sank the oil.

11 Claims, 5 Drawing Figures

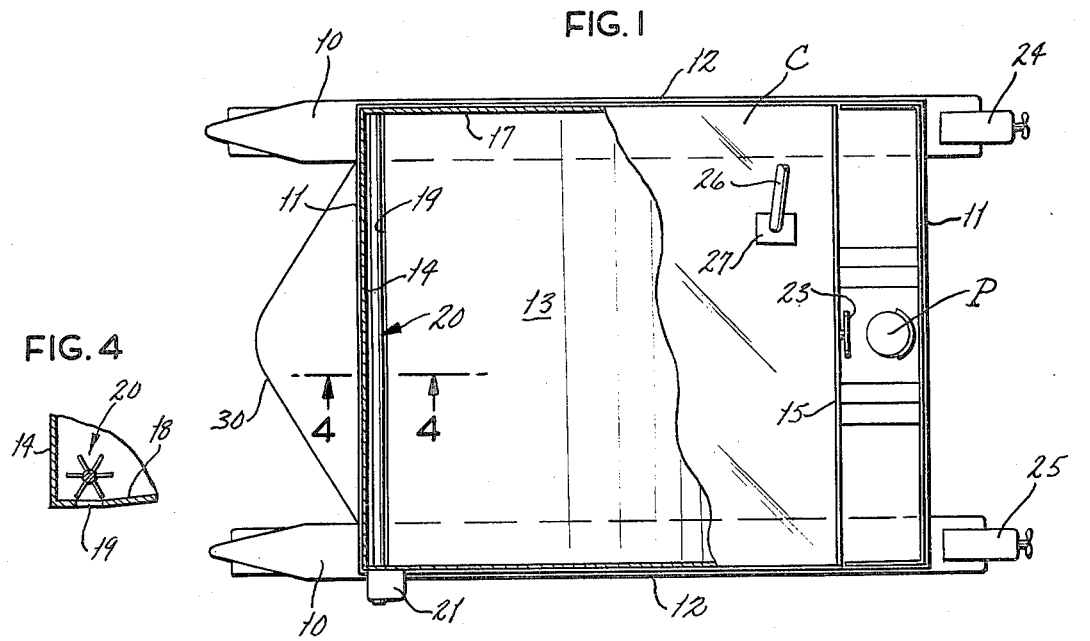
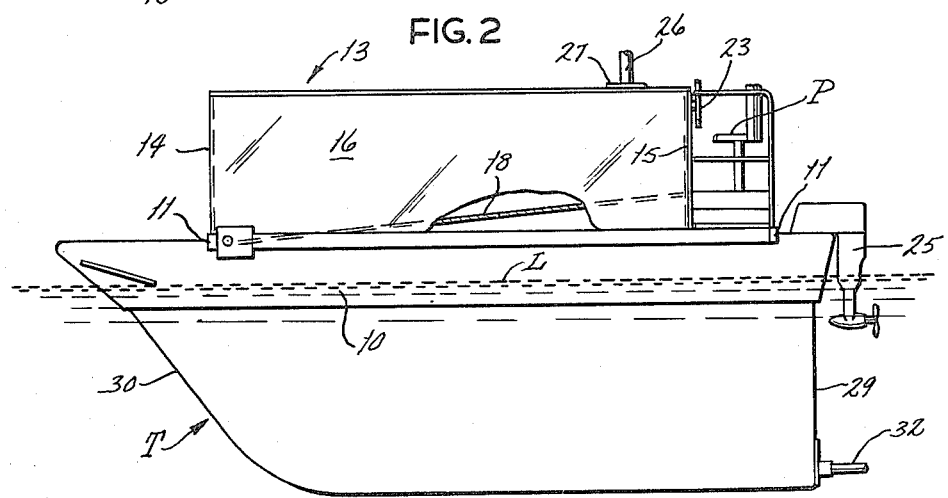
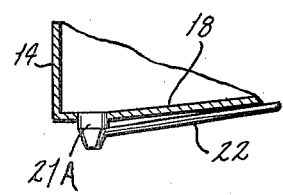
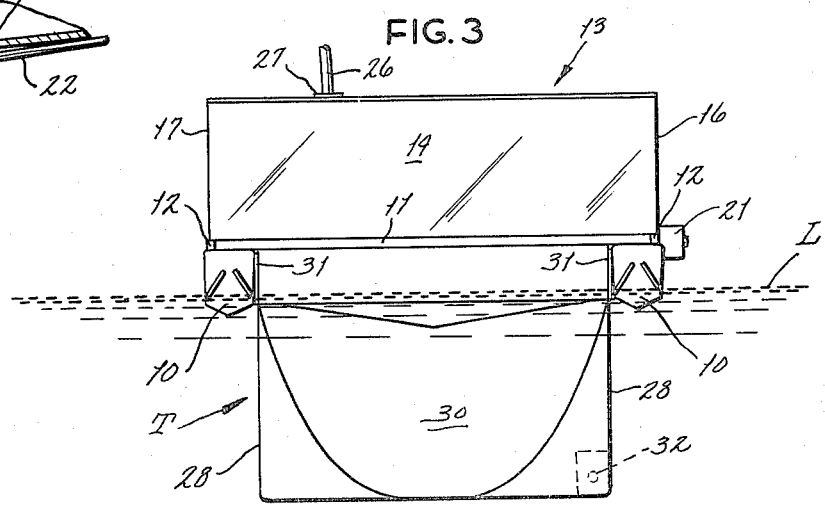

OIL SPILL RECOVERY METHOD AND APPARATUS

BACKGROUND OF THE INVENTION

The spilling of oil on water is never an act that has any really useful purpose, but it is especially harmful when a large quantity of oil is spilled or released, by accident or otherwise, upon water because it will tend to float and form a cover which excludes oxygen and smothers acquatic life, such as fish and water fowl. A great amount of effort has been expended to recover oil in a spill, some of which may allow for recovery at great expense and some of which renders the oil unusuable or nearly impossible to recover.

Examples of oil spill control and recovery efforts include the use of absorbent means such as straw, the use of detergent material to combine with the oil and change its character, and caging means to surround an oil spill to keep it from spreading while recovery or removal activities are exercised.

BRIEF DESCRIPTION OF THE INVENTION

This invention relates to oil spill recovery medium and apparatus and to the method whereby the medium acts on the oil in an oil spill on water to facilitate its recovery in novel apparatus.

The general objects of this invention are to provide a system for recovering oil in an oil spill on water by sinking the oil as rapidly as possible into recovery apparatus, to make use of the recovery apparatus as the vehicle which transports the medium which acts on the oil to cause it to sink, and to provide a system which can function rapidly when brought to an oil spill site to extract the oil from the water by causing the oil to lose its buoyancy so it can be gathered up and separated from the water.

In its preferred form the recovery medium consists of a dry granular clay material which is free of all moisture by firing and which has a high affinity for oil so as to absorb oil sufficiently rapidly enough so water will not be also absorbed in any significant amount. There are a number of clay material which will function as desired to become oil absorbers and remain sufficiently fluid to be capable of being pumped by generally conventional equipment. The clay that is most preferred is sometimes referred to as Porter's Creek clay which in some cases will perform the desired oil precipitating function when applied on an oil spill by itself in sufficient quantity to absorb oil and cause it to loose its natural buoyancy and sink. It is also a preferred form of oil recovery medium to combine the dry fired granular clay with a ballasting medium such as metallic flux materials. A preferred flux is submerged arc welding flux containing aluminum oxides ($Al_2O_3$) and manganese oxides (MnO). The flux is characterized by having a nonhygroscopic nature and is capable of being ground to a very fine condition so as to add ballast weight to clay while not greatly adding to the volume of the mix.

The apparatus most preferred consists of a floating structure which carries a dispensing unit for the mixed clay and its ballast means, as well as a submerged recovery unit which functions with the dispensing unit to collect and contain the sinking oil treated with the recovery medium. The floating structure may be self propelled so as to proceed into an oil spill while distributing the recovery medium in position to sink the oil into the submerged recovery unit. Whether the floating structure is propelled into an oil spill or is held stationary while the oil spill flows into it, the water from which the oil has been removed by sinking is free to pass over the submerged recovery unit. The floating structure may be coupled to an auxiliary unit by suitable communication means to supply additional recovery medium and to pump out recovered oil from the recovery unit, whereby the operation of cleaning up an oil spill can be continued for extended periods of time, depending upon the extent of the oil spill.

BRIEF DESCRIPTION OF THE DRAWINGS

The preferred apparatus associated with the oil spill recovery medium is shown in the accompanying drawing, wherein;

FIG. 1 is a plain view, partly in section, of the floating structure forming part of the invention;

FIG. 2 is a side elevation of the floating structure taken along line 2—2 in FIG. 1;

FIG. 3 is a front view of the floating structure taken along line 3—3 in FIG. 1;

FIG. 4 is an enlarged and fragmentary sectional view taken along line 4—4 in FIG. 1; and FIG. 5 is a fragmentary view partly in section of an air blast nozzle for forced delivery of the agent upon an oil spill to effect the sinking thereof.

DETAILED DESCRIPTION OF THE INVENTION

The present invention combines a unique oil sinking agent and a floating unit which is capable of handling both the agent and the oil and agent combination so that an oil spill clean up can be effected rapidly and substantially completely without polluting the water or creating ecological problems. The handling of an oil spill is only partly accomplished by the application of absorbers and means to break up the oil and dispense it. A complete system has to be effective in collecting the oil and rendering it easily manageable so it can be removed from the water without contaminating the water, thereby leaving the water in the condition it had before the oil spill.

THE OIL TREATING MEDIUM

The oil treating medium or agent comprises a dry clay and a ballasting flux which together function to separate oil from water and renders the oil capable of being captured in a collecting container. The agent sinks the oil and at the same time absorbs oil so it is prevented from mixing with the water. The sinking of the oil and agent will occur when the specific gravity thereof exceeds the specific gravity of the water on which the oil is spilled. The preferred clay is Porter's Creek clay, although other clay materials are suitable and have been found to function in a satisfactory manner. Porter's Creek clay is a montmorillonite clay. Sources of this type of clay include Southern Clay Company, Paris, Tennessee, and Lowes, Inc., Oran, Missouri. Clay by itself will absorb oil but it does not cause sinking in all cases. However, when the clay is combined with a ballast material to overcome the natural buoyancy of oil the oil can be contained and recovered since it can be removed from the water. A metallic flux in a highly ground state of fineness will supply the ballast means to the clay without interferring with the oil absorbing capacity of the clay.

Before the clay is mixed with the flux, it should be cooked or fired to drive out substantially all moisture. This can be accomplished by firing the clay at a temperature range of about 1100° to 1200° F. After the fired clay cools to a normal room temperature it should be ground in a conventional grinding mill to a state where the clay will pass a 28 mesh screen. Once the clay has been dried and ground it is mixed with a ballast medium, such as a metallic flux, so that there will result a mixture in which the major amount of the ground clay-flux mixture should comprise clay. The preferred proportion of clay-flux should be about 70% to about 90% by volume of clay and the flux will then make up the balance and will vary by volume between about 10% to 30%. As the viscosity of the oil to be recovered decreases, a lower amount of the ballast medium is required. Sufficient ballast material should be used to promote sinking of oil. If the oil is highly viscous and possesses a high degree of buoyancy, as much as about 40% of the volume of the agent may consist of ballast material. However, this amount represents the upper limit.

It is also possible to make up a clay mud by dissolving the clay in water. The mud is then mixed with the flux, and the resulting mixture is fired to a temperature of about 1100°–1200° F. The fired product is then ground to size capable of passing a 28 mesh screen.

The clays contemplated in this invention include the aluminum silicate-bearing rocks of various compositions and degrees of purity. They are plastic when wetted and possess a degree of hardness when fired. The major portion of any clay are $Al_2O_3.2SiO_2.2H_2O$ (kaolinite), or $Al_2O_3.3SiO_2.2H_2O$ (halloysite) or $(Mg,Ca)0.Al_2O_3.5SiO_2.5SiO_2.NH_2O$ (Montmorillonite), or $K_2O_1Mg).Al_2O_3.SiO_2.H_2O$ (illite). The requirements for the clays are they must be capable of interacting with oil in the presence of water so as to very rapidly absorb the oil while remaining in a mechanical mix with the ballast. Experiments with different clay has shown Porter's Creek clay to be highly desirable for capturing oil.

The ballast can be a composition of welding flux which usually varies over a broad range. A typical flux comprises $SiO_2$, $MgO$, and $CaO$. Suitable additives include $Al_2O_3$ and $MnO$. The flux may be of either the bonded or fused variety. The purpose of the flux is to function as ballast in the oil-clay-flux complex in order to overcome the buoyancy of oil and cause the complex to sink below the surface of the body of water.

The clay-flux mixture is suitable for causing any conventional oil which is present in an aqueous medium to separate from such medium and sink. Oils on which the mixture has been tested include vegetable oil, fuel oil, crankcase oil, transmission fluid, and crude oils from Southern Illinois, from Edinburg, Illinois, from Pennsylvania and from Texas. This material works on anything with an oil base that is in salt water or fresh water.

The oil mixture complex which is formed upon contact is extremely stable. The complex can remain in the form of an agglomerate for periods in excess of 1 to 1½ years. The complex retains its stability even when submerged up to 70 feet in water. It is also stable when agitated during pumping which is as extremely useful characteristic when moving the complex from its recovery tank to a land based container.

To recover the oil from the complex, heating the complex in water and at a temperature above 150° F. is effective to float the oil which can be skimmed off. The clay-flux mixture can also be recovered, dried, and employed in a subsequent oil recovery operation.

The action of the herein preferred agent is handled by means of apparatus which is both an applicator and a collector as best seen in the drawings. The apparatus comprises a recovery tank which is sufficiently submerged so its upper margins are several inches below the water level, pontoon or floatation means capable of supporting the tank in its submerged position, a storage bin carried on the pontoon or floatation means above the water level, and means carried by the foregoing equipment to release the agent in an even spread upon an oil spill and at a location where the settling of the oil and agent takes place adjacent the recovery tank. The sinking of the oil and agent does not unduly affect the water so it is free to pass beyond the submerged recovery tank.

A preferred form of recovery apparatus shown in the drawings comprises a pair of pontoons or floatation means 10 interconnected by a frame having spanner members 11 holding the means 10 in spaced relation, and longitudinal members 12. The frame carries a water and rain proof storage bin 13 having front and rear transverse walls 14 and 15, and opposite side walls 16 and 17. The bin 13 may be of the open top type, but provided with a flexible or canvas rain proof cover seen in part at C. The bin is formed with a pitched floor 18 (FIG. 2) directed toward the front wall 14 wherein there is formed an elongated slot 19. A rotary spreader 20 is mounted between the said side walls so it may be rotated by motor means 21 adjacent the slot 19 and release the agent between the pontoons or floatation means 10.

In cases where the bin 13 needs to be raised some distance above the oil spill, for what ever reason, the agent can be forcibly discharged, as seen in FIG. 5. In this alternate view, one or more aspirating nozzles 21A can be fixed in the slot 19 and a source of compressed air (not necessary to show) can be supplied by hose 22 to drive the agent. This alternate arrangement is most useful when the agent is released under wind conditions that would make gravity discharge uncertain.

Control of the floatation means 10 and the storage bin 13 may be by a pilot stationed at location P where control means 23 may be operatively situated to regulate the propulsion motors 24 and 25 which maneuvering the pontoons or floatation means 10 for positioning the recovery equipment where it may be most effective to meet an oil spill. Loading of the agent may be a suitable hose or conduit 26 having its discharge end connected at 27 to the cover C.

The recovery equipment includes the recovery tank T having sides 28, stern end wall 29, and a prow 30 shaped to offer minimum resistance to movement of the tank. The tank T has its opposite sides 28 connected to the pontoons 10 by suitable stays 31 so that the tank T is normally located several inches below the water level L. Thus, the recovery tank is filled with water and in the movement of the tank, or the water relative to the tank, the water is free to run over the stern wall 29. The location of the recovery tank prow 30 is ahead of the slot 19 so that the release of the agent will occur well within the prow. The reason is that within a very short time after the agent hits the oil slick it will begin sinking the oil.

The operator of the present apparatus is able to visually maneuver the pontoons 10 into position to pass on either side of an oil spill and to operate the spreader motor 21 to release the agent. This operation is performed when the oil spill is in a lake or body of water which has no definite flow pattern, so the forward motion of the pontoons by the propulsion motors 24 and 25 is necessary to effect recovery of the oil in a spill. On the other hand, if an oil spill occurs in a river or where the water has a clearly defined flow direction, the present floating apparatus can be maneuvered to head upstream and hold its position by sufficient propulsion or it can anchor to hold position to just balance the flow velocity, or to exceed the flow velocity to speed up recovery. Additionally, booms can be used to guide an oil spill into the location of the tank T.

The physical size of the apparatus may be selected for meeting oil spill conditions, as well as its location at sea, or in a lake, river or stream. The unique feature of the apparatus is its ability to carry an oil sinking agent to be delivered upon an oil spill, to contain the spill between the pontoons, to spread the agent upon the floating oil and initiate its submergence into the recovery tank, the ability to allow the water substantially free of oil to flow past the stern wall of the tank, and the provision of a conduit or suction outlet conduit 32 associated with the tank so that recovered oil and its submerging agent may be removed from the tank to make room for more as needed. The recovery operation can continue almost indefinitely by continuing to supply fresh agent by conduit 26 and removing the recovered agent and oil by conduit 32. The oil and agent removed through conduit 32 can be delivered to a barge (not shown) trailing the recovery apparatus, and such a barge can also supply agent through conduit 26.

While the apparatus shown in FIGS. 1, 2 and 3 may be more suitable for river or lake oil spill recovery, it should be understood that the principle of the present disclosure can be applied to apparatus capable of operating at sea or in tidal waters. Furthermore, several oil spill recovery means of the herein described character may be used in recovery of oil spills which cover a large area or a location where recovery must be expedited, such as off-shore spills.

The foregoing composition of clay and flux ballast is free of toxic chemicals so that it will not contaminate water or pollute the water or its environment. The complex of clay-flux and oil is capable of being handled without special clothing or equipment, and it is non-flammable under normal conditions. Long exposure of the complex to water will not break down the ability of the clay to hold the oil and not release it back to the water. While it is not expected to allow the complex to remain submerged in water for any extended period of time, never-the-less it has been allowed to remain submerged for a time in excess of one year.

An effective treatment of an oil spill on water must include containment of the oil and its separation from the water. The present invention accomplishes these steps and does it in a simple and inexpensive manner, and uses an oil agent which when treated with heat will release the oil in a condition such that it has not lost its original characteristics.

What is claimed is:

1. Apparatus for recovery of oil in an oil spill upon water by sinking the oil and collecting the oil below the surface of the water, said apparatus comprising: a container for an oil sinking agent, means carried by said container and operable to release the contents of the container upon the oil spill beneath the container, thereby sinking the oil and oil sinking agent below the surface of the water; a collecting vessel formed with spaced sides and bow and stern ends and a bottom surface, said collecting vessel being submerged with said bow and stern below the water surface and with said bottom in position to arrest the sinking oil and oil sinking agent and accumulate it at a depth below the water surface to be substantially isolated from the motion of the water at the surface; and means connecting said container and collecting vessel for cooperation in depositing the agent upon the oil spill and collecting the oil and oil sinking agent sinking below the surface of the water, said submerged collecting vessel permitting the oil spill to enter over said bow and water substantially free of oil to pass said collecting vessel by at least said stern end.

2. The apparatus set forth in claim 1 wherein; said means to deposit an oil sinking agent comprises an elongated rotary spreader operative to release the agent directly from said container upon the oil spill between said spaced side walls of said collecting vessel.

3. The apparatus set forth in claim 1 and including propulsion means for maneuvering said submerged collecting vessel under the oil spill, said submerged vessel permitting the water substantially free of oil to pass over said sides and at least said stern end.

4. The apparatus set forth in claim 1 wherein means is connected to said collecting vessel below the surface of the water for extracting the oil and agent from said collecting vessel.

5. In apparatus for recovery of oil from an oil spill upon water by sinking the oil below the surface of the water and collecting it under the free surface of the water, the improvement which comprises: a container; float means connected to said container for supporting said container spaced above the water, said float means being spaced apart to provide open water surface under said container; an oil sinking agent in said container; means in said container operable for releasing said sinking agent to strike the oil in the spill on the open water between said float means; and a recovery vessel suspended from said float means and positioned below the free surface of the water, said recovery vessel having a width to substantially span the space between said float means and having submerged bow and stern ends, whereby the oil spill is able to enter the space between said float means over said bow and water substantially free of oil is able to leave the space over said stern while the oil and sinking agent collect in said recovery vessel.

6. The improvement set forth in claim 5 wherein means is connected to said collecting vessel for extracting the oil and sinking agent therefrom, whereby recovery of oil from an oil spill is substantially continuous.

7. A method of treating an oil spill on water comprising the steps of supporting a recovery vessel in a position such that it is submerged beneath the water and oil in the spill, depositing an oil sinking agent on top of the oil in the spill over the recovery vessel, said agent being an initially substantially dry granular clay material having an affinity for oil, whereby the change in the specific gravity of the oil by the agent relative to the water causes the oil and agent to sink into and accumulate in the recovery vessel, and allowing the water over the recovery vessel to pass substantially free of oil.

8. The method set forth in claim 7 wherein; the recovery vessel and the oil spill move relative to each other, and the accumulated oil and agent are removed from the recovery vessel during the treating of the oil spill.

9. A method of treating an oil spill on water comprising the steps of submerging a recovery vessel beneath the surface of the water and spaced beneath the oil in the spill, and depositing an agent on top of the oil over the recovery vessel, whereby the oil is caused to sink below the surface of the water into the recovery vessel while the water is free to pass above the recovery vessel and is substantially free of the oil.

10. The method set forth in claim 9 wherein the submerged recovery vessel and the oil spill move relative to each other while the oil and agent are sinking whereby the recovery is substantially continuous.

11. The method set forth in claim 9 wherein the oil caused to sink into the recovery vessel is removed from the recovery vessel while it is beneath the oil spill.

* * * * *